Feb. 23, 1937.   A. L. V. C. DEBRIE   2,071,782
CINEMATOGRAPHIC PROJECTOR EMPLOYING COMBINED SOUND AND PICTURE FILMS
Filed Feb. 13, 1936
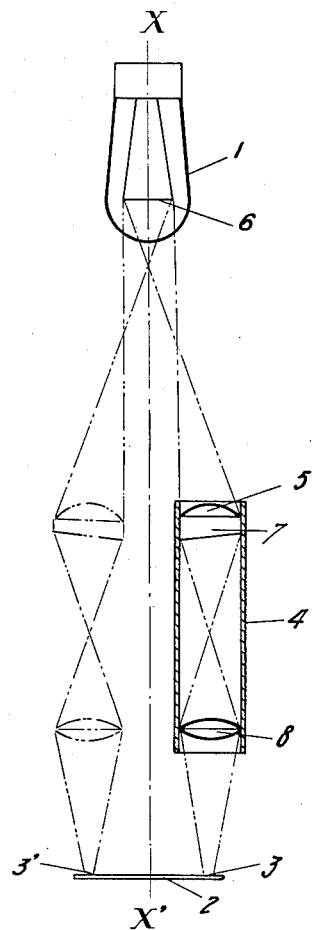

Patented Feb. 23, 1937

2,071,782

UNITED STATES PATENT OFFICE 2,071,782

CINEMATOGRAPHIC PROJECTOR EMPLOYING COMBINED SOUND AND PICTURE FILMS

André Léon Victor Clement Debrie, Paris, France

Application February 13, 1936, Serial No. 63,802
In France February 26, 1935

2 Claims. (Cl. 179—100.3)

It is already known, in cinematographic projectors employing combined sound and picture films to use the same lamp for projecting the pictures and for illuminating the photo-electric cell. In the said apparatus the filament of the lamp is necessarily disposed just in front of the axis of the film and of the object glass; under the lamp is disposed the photo-electric cell, and between them an optical device focusing the luminous rays issuing from the lamp on to the strip of the film constituting the sound record; since this strip is on one side of the film, it would therefore be necessary to incline the optical axis of the focusing device with reference to the vertical and this would result in difficulties in the manufacture and in an inadequate oblique illumination of the sound strip recorded on the film.

The object of the present invention is to provide an optical device the optical axis of which is vertical and displaced with reference to the vertical line passing through the center of the filament, the said device being provided with a wedge deflecting the luminous beam issuing from the lamp and which, because of this displacement is not vertical, in such a way that it becomes vertical inside the said device.

The following disclosure with reference to the appended drawing indicates by way of example a practical form of the invention.

The figure shows diagrammatically in cross section the optic device.

In the said figure, 1 is the lamp and 2 the film part of which not shown, passes in front of the lamp at the level thereof for picture projecting; 3 is the strip along which the sound is recorded, the strip being assumed to be on the right side of the film. The optical device comprises a tube 4, the axis of which is vertical, but disposed sufficiently to the right of the vertical line XX' passing through the centre of the filament 6, to pass through the strip 3.

In said tube is mounted an object glass, such as a lens 5, which receives the luminous beam issuing from the filament 6; behind the said lens is disposed a wedge 7, which can be positioned against the lens or even be integral therewith; this wedge deflects the luminous beam in such a way that its axis becomes vertical, and the beam then impinges on an optical part represented here diagrammatically by a lens 8, which focuses it on the sound strip 3.

If the strip 3' were positioned on the left side of the film instead of the right side it would be sufficient to dispose the optic device symmetrically with reference to the vertical line XX'; and as represented by dotted lines in the figure.

What I claim is:

1. In a cinematographic projector for combined picture and sound films including a common picture and sound projecting lamp, the provision of an optical device for focusing a light beam from the lamp on to a portion of the sound record on the film and adapted to be arranged in front of said sound record on whatever edge of the film it lies, the optic axis of said optical device lying perpendicularly to the surface of the film at the point on which the beam is focused and parallel with the longitudinal axis of the lamp passing through the center of the lamp filament and at a small distance from said longitudinal axis towards the edge of the film which carries the sound record, said optic device including a wedge adapted to deflect the beam along the optical axis of the optical device and lenses to either side of said wedge the foci of which are respectively on the filament of the lamp and on the sound record.

2. In a cinematographic projector for combined picture and sound films including a common picture and sound projecting lamp, the provision of an optical device for focusing a light beam from the lamp on to a portion of the sound record on the film and adapted to be arranged in front of said sound record on whatever edge of the film it lies, the optic axis of said optical device lying perpendicularly to the surface of the film at the point on which the beam is focused and parallel with the longitudinal axis of the lamp passing through the center of the lamp filament and at a small distance from said longitudinal axis towards the edge of the film which carries the sound record, said optic device including a wedge adapted to deflect the beam along the optical axis of the optical device and lenses to either side of said wedge the foci of which are respectively on the filament of the lamp and on the sound record, at least one of said lenses forming a unit with the wedge.

ANDRÉ LÉON VICTOR CLEMENT DEBRIE.